(12) United States Patent
Petrova et al.

(10) Patent No.: US 12,242,094 B1
(45) Date of Patent: Mar. 4, 2025

(54) WIRE GRID POLARIZER WITH PROTECTIVE CAP

(71) Applicant: Moxtek, Inc., Orem, UT (US)

(72) Inventors: Rumyana V. Petrova, Pleasant Grove, UT (US); R. Stewart Nielson, Pleasant Grove, UT (US); Michael Black, Orem, UT (US)

(73) Assignee: Moxtek, Inc., Orem, UT (US)

(*) Notice: Subject to any disclaimer, the term of this patent is extended or adjusted under 35 U.S.C. 154(b) by 485 days.

(21) Appl. No.: 17/730,349

(22) Filed: Apr. 27, 2022

Related U.S. Application Data

(60) Provisional application No. 63/193,713, filed on May 27, 2021.

(51) Int. Cl.
*G02B 5/30* (2006.01)
*G02B 1/04* (2006.01)

(52) U.S. Cl.
CPC .............. *G02B 5/3058* (2013.01); *G02B 1/04* (2013.01)

(58) Field of Classification Search
CPC ................................ G02B 5/3058; G02B 1/04
See application file for complete search history.

(56) References Cited

U.S. PATENT DOCUMENTS

| | | | |
|---|---|---|---|
| 2009/0214872 A1* | 8/2009 | Minami-Ashigara-Shi ................ | G02B 1/04 427/163.1 |
| 2011/0096396 A1* | 4/2011 | Kaida .................... | C23C 14/225 427/126.3 |
| 2011/0286094 A1* | 11/2011 | Kaida .................. | G02B 5/3058 359/485.05 |
| 2012/0236410 A1* | 9/2012 | Akita .................... | G02B 5/3058 359/485.05 |
| 2018/0180786 A1* | 6/2018 | Takeda ................. | G02B 5/3058 |

* cited by examiner

*Primary Examiner* — Cara E Rakowski
*Assistant Examiner* — Jennifer A Jones
(74) *Attorney, Agent, or Firm* — Thorpe North & Western, LLP

(57) ABSTRACT

Each wire 12 of a wire grid polarizer can include a cap 22 on a reflective rib 21. The cap 22, with dimensions and material as specified herein, can protect the reflective rib 21 from corrosion and can improve performance of the wire grid polarizer. The cap 22 can be located on the distal end 21$_d$ and the pair of sidewalls 21$_S$ of the reflective rib 21. Cap 22 chemistry can include CO, C=O, COO, aluminum fluoride, and aluminum oxide. Each cap 22 can have a maximum thickness Th$_{CS}$ on the sidewall 21$_S$ of the reflective rib 21 in an upper 50% (above plane 31) of the wire 12 farthest from the substrate 11. Each cap 22 can have a maximum thickness Th$_{CS}$ on the sidewall 21$_S$ that is greater than a maximum thickness Th$_{CD}$ of the cap 22 on the distal end 21$_d$.

19 Claims, 3 Drawing Sheets

WIRE GRID POLARIZER WITH PROTECTIVE CAP

CLAIM OF PRIORITY

This application claims priority to US Provisional Patent Application Number U.S. 63/193,713, filed on May 27, 2021, which is incorporated herein by reference.

FIELD OF THE INVENTION

The present application is related to wire grid polarizers.

BACKGROUND

A wire grid polarizer can divide light into two different polarization states. One polarization state can primarily pass through the wire grid polarizer. The other polarization state can be primarily absorbed or reflected. The effectiveness or performance of wire grid polarizers is based on high transmission of a predominantly-transmitted polarization (sometimes called Tp) and minimal transmission of an opposite polarization (sometimes called Ts).

It can be beneficial to have high contrast (Tp/Ts). Contrast can be improved by increasing transmission of the predominantly-transmitted polarization (e.g. increasing Tp) and by decreasing transmission of the opposite polarization (e.g. decreasing Ts).

Wires of wire grid polarizers, especially for polarization of visible or ultraviolet light, can be small and delicate with nanometer-sized pitch, wire-width, and wire-height. Wire grid polarizers are used in systems (e.g. computer projectors, semiconductor inspection tools, etc.) that require high performance. Corroded wires can significantly degrade system performance (e.g. distorted image from a computer projector). Therefore, it can be useful to protect the wires from corrosion.

BRIEF DESCRIPTION OF THE DRAWINGS (DRAWINGS MIGHT NOT BE DRAWN TO SCALE)

FIG. 1 is a perspective-view of a wire grid polarizer 10 with an array of wires 12 on a substrate 11 with a channel between each pair of adjacent wires 12.

FIG. 2 is a cross-sectional side-view of a wire grid polarizer 20. Each wire 12 includes a cap 22 on a reflective rib 21.

FIG. 3 is a cross-sectional side-view of a wire grid polarizer 30, showing dimensions of a maximum width $W_R$ of the reflective rib 21, a maximum thickness $Th_{CS}$ of the cap 22 on the sidewall 21$_S$, and a maximum thickness Theo of the cap 22 on the distal end 21$_d$.

FIG. 4 is a cross-sectional side-view of a wire grid polarizer 40. Each wire 12 is located on a substrate rib 11$_R$.

DEFINITIONS

Figure 1:
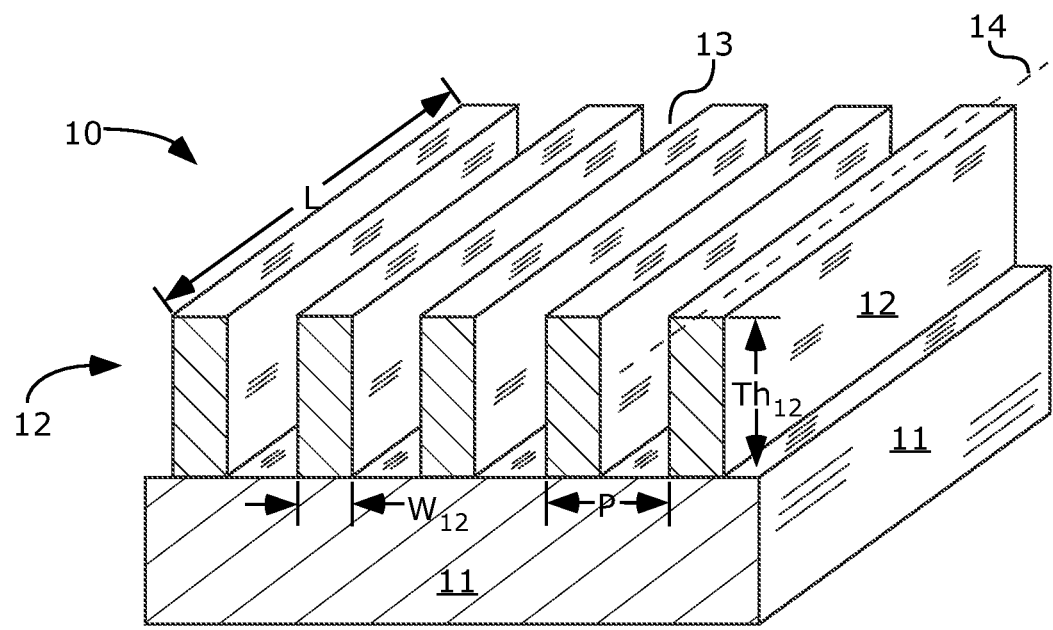

The following definitions, including plurals of the same, apply throughout this patent application.

As used herein, the term "elongated" means that wire length L is substantially greater than wire width $W_{12}$ and wire thickness $Th_{12}$. For example, wire length L can be ≥10 times, ≥100 times, ≥1000 times, or ≥10,000 times larger than wire width $W_{12}$, wire thickness $Th_{12}$, or both. See FIG. 1.

As used herein, the terms "on", "located on", "located at", and "located over" mean located directly on or located over with some other solid material between. The terms "located directly on", "adjoin", "adjoins", and "adjoining" mean direct and immediate contact.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

DETAILED DESCRIPTION

As illustrated in FIGS. 1-4, wire grid polarizers 10, 20, 30, and 40 can include an array of wires 12 on a substrate 11 with a channel 13 between each pair of adjacent wires 12. The array of wires 12 can be parallel and elongated. A pitch P of the wires 12 can be less than ½ of a lowest wavelength of a desired range of polarization (e.g. P<200 nm for polarization of visible light). The channels 13 can be filled with air or other gas, vacuum, liquid, solid, or combinations thereof. Any solid in the channels 13 can be transparent. The substrate 11 can be transparent.

Figure 2:
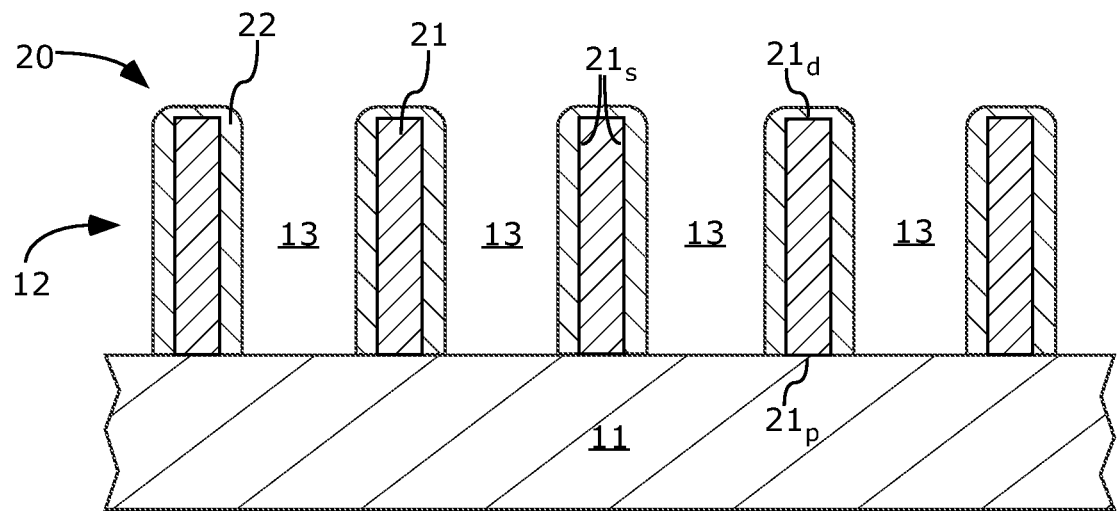
Figure 3:
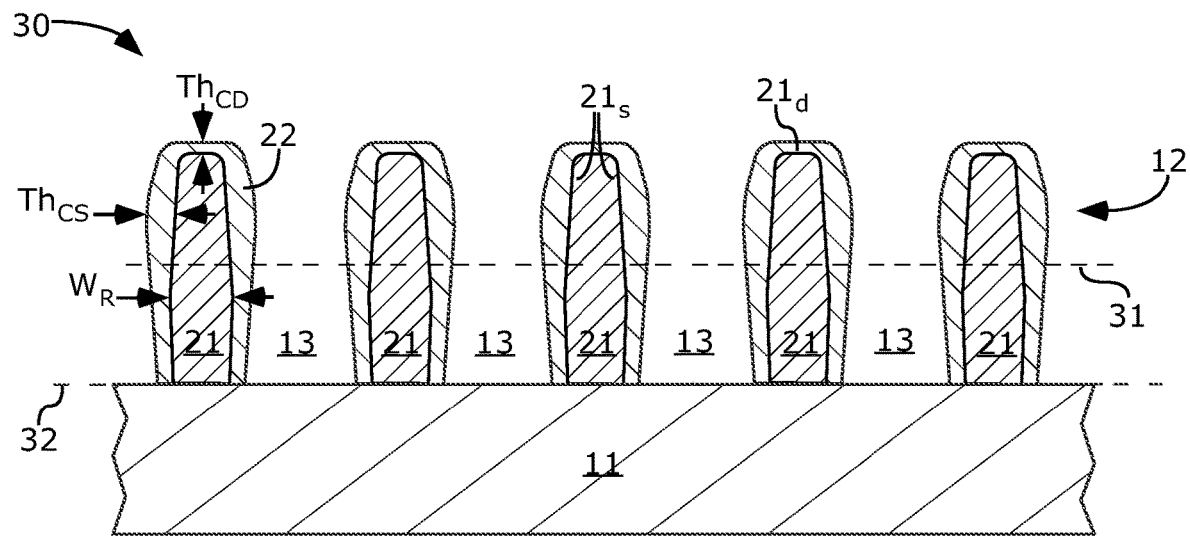
Figure 4:
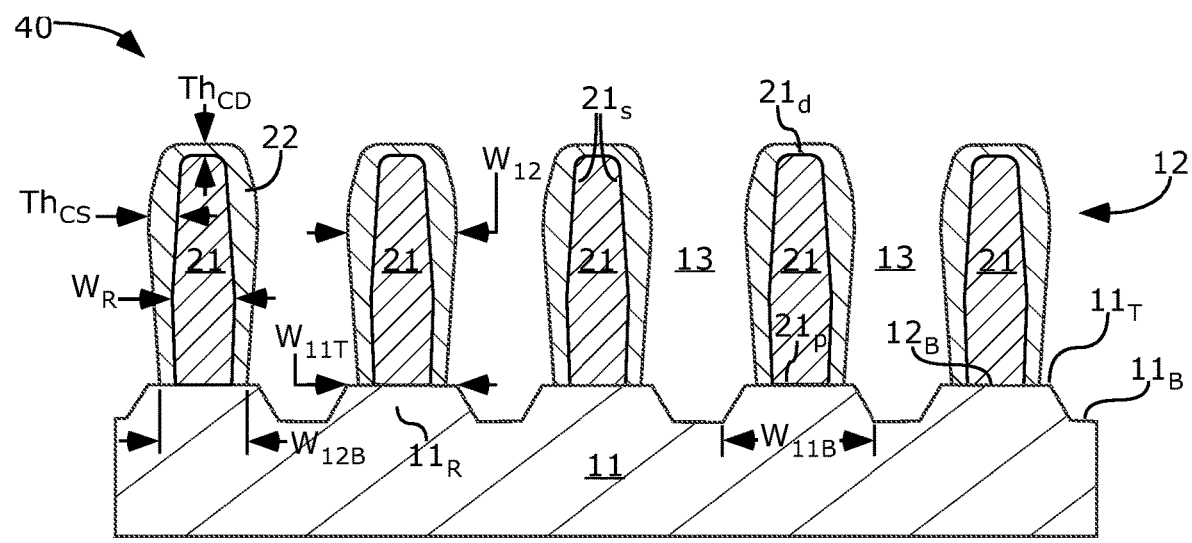

As illustrated on wire grid polarizers 20, 30, and 40 in FIGS. 2-4, each wire 12 can include a cap 22 on a reflective rib 21. The cap 22, with dimensions and material as specified herein, can protect the reflective rib 21 from corrosion and can improve performance of the wire grid polarizer 20, 30, or 40.

Each reflective rib 21 can have a distal end 21$_d$ farthest from the substrate 11, a proximal end 21$_p$ closest to the substrate 11, and a pair of sidewalls 21$_S$. Each sidewall 21$_S$ can face a channel 13 and can extend from the distal end 21$_d$ to the proximal end 21$_p$. Each cap 22 can be located on the distal end 21$_d$ and the pair of sidewalls 21$_S$ of one of the reflective ribs 21.

Each cap 22 can be separated from caps 22 of adjacent wires 12 by the channels 13. Thus, a face of the substrate 11 at a center of the channels 13 can be free of material of the caps 22.

The cap 22 can completely cover the distal end $21_d$ of the reflective rib 21.

It is preferable for protection of the reflective rib 21 that the cap 22 covers all of the sidewalls $21_S$ of the reflective rib 21. But it is difficult to achieve complete coverage of the sidewalls $21_S$ without connection of caps 22 across the channel 13. For example, the cap 22 can cover≥50%, ≥70%, ≥90%, ≥95%, or all of the sidewalls $21_S$. The cap 22 can be formed as the reflective ribs 21 and the substrate ribs $11_R$ are formed. Formation of the substrate ribs $11_R$ can increase cap 22 coverage of the sidewalls $21_S$.

As illustrated in FIG. 3, each reflective rib 21 can have a maximum width $W_R$ in a lower 50% (below plane 31) of the wire 12 closest to the substrate 11. This can reduce toppling of the wires 12. Increased use of hydrogen bromide in the etch, overetching the wires 12 (i.e. continued etch after reaching the substrate 11), medium to high radio frequency power, and low to medium bias voltage can produce wires 12 with this shape.

Each cap 22 can have a maximum thickness $Th_{CS}$ on the sidewall $21_S$ of the reflective rib 21 in an upper 50% (above plane 31) of the wire 12 farthest from the substrate 11. Thus, the cap 22 can provide increased protection near the distal end $21_d$ where there is a greater risk of corrosion. Increased use of hydrogen bromide in the etch and reduced etching of the mask can produce caps 22 with this shape.

A ratio of the maximum width $W_R$ of the reflective rib 21 to the maximum thickness $Th_{CS}$ of the cap 22 on the sidewall $21_S$ can be selected for optimal wire grid polarizer performance and reflective rib 21 protection. For example, $0.5 \leq W_R/Th_{CS}$, $1 \leq W_R/Th_{CS}$, or $1.5 \leq W_R/Th_{CS}$. Other examples include $W_R/Th_{CS} \leq 1.5$, $W_R/Th_{CS} \leq 3$, or $W_R/Th_{CS} \leq 10$. The maximum width $W_R$ and the maximum thickness $Th_C$ can both be measured on a single wire. The maximum width $W_R$ and the maximum thickness $Th_C$ can be measured perpendicular to a longitudinal axis 14 of the wire 12 (see longitudinal axis 14 in FIG. 1) and parallel to a plane 32 at the proximal end $21_p$ of the reflective ribs 21.

Each cap 22 can have a maximum thickness $Th_{CS}$ on the sidewall $21_S$ that is greater than a maximum thickness $Th_{CD}$ of the cap 22 on the distal end $21_d$. This can increase transmission of a predominantly-transmitted polarization (e.g. increase Tp), and thus improve polarizer performance. Thus, for example, a minimum of $Th_{CS}/Th_{CD}$ can be in the following range: $1.2 \leq Th_{CS}/Th_{CD}$, $1.5 \leq Th_{CS}/Th_{CD}$, $2 \leq Th_{CS}/Th_{CD}$, or $3 \leq Th_{CS}/Th_{CD}$. Some thickness $Th_{CD}$ of the cap 22 is useful for protection of the distal end $21_d$ the reflective rib 21. Thus, a maximum of $Th_{CS}/Th_{CD}$ can be in the following range: $Th_{CS}/Th_{CD} \leq 2.5$, $Th_{CS}/Th_{CD} \leq 3$, $Th_{CS}/Th_{CD} \leq 4$, $Th_{CS}/Th_{CD} \leq 6$, or $Th_{CS}/Th_{CD} \leq 10$. Use of an anisotropic etch at the end of the etch can produce caps 22 with this shape.

Both of the maximum thicknesses $Th_{CS}$ and $Th_{CD}$ are measured on a single wire 12 and measured perpendicular to a longitudinal axis 14 of the wire 12 (see longitudinal axis 14 in FIG. 1). The maximum thickness $Th_{CS}$ of the cap 22 on the sidewall $21_S$ is measured parallel to a plane 32 at the proximal end $21_p$ of the reflective ribs 21. The maximum thickness Theo of the cap 22 on the distal end $21_d$ is measured perpendicular to the plane 32 at the proximal end $21_p$ of the reflective ribs 21.

As illustrated in FIG. 4, each wire 12 can be located on a substrate rib $11_R$. Each substrate rib $11_R$ can be integral with the substrate 11. The substrate rib $11_R$ can have a shape and size for improved wire grid polarizer performance, improved formation of the cap 22, or both, as will be explained in the following paragraph.

Each substrate rib $11_R$ can have a base $11_B$ adjoining the substrate 11 and a top $11_T$ adjoining a bottom $12_B$ of the wire 12. A width $W_{11T}$ of the bottom $11_B$ of the substrate rib $11_R$ can be greater than a width $W_{12B}$ of the top $11_T$ of the substrate rib $11_R$ ($W_{11B} > W_{11T}$). This relationship can improve wire grid polarizer performance. Decreased use of carbon tetrafluoride in the etch, low radio frequency power, and high pressure can produce substrate ribs $11_R$ with this shape.

For example, $W_{11B}/W_{11T} \geq 1.05$, $W_{11B}/W_{11T} \geq 1.1$, or $W_{11B}/W_{11T} \geq 1.2$. Other examples include $W_{11B}/W_{11T} \leq 1.3$, $W_{11B}/W_{11T} \leq 1.5$, or $W_{11B}/W_{11T} \leq 1.8$. $W_{11B}$ and $W_{11T}$ are measured perpendicular to a longitudinal axis 14 of the wires 12 and parallel to a plane 32 at the proximal end $21_p$ of the reflective ribs 21.

A width $W_{11T}$ of the top $11_T$ of the substrate rib $11_R$ can be greater than a width $W_{12B}$ of the bottom $12_B$ of the wire 12 ($W_{11T} > W_{12B}$). A relationship between dimensions of the substrate rib $11_R$ and the wire 12 can be selected for improved wire grid polarizer performance, improved formation of the cap 22, or both.

For example, $W_{11T}/W_{12B} \geq 1.05$, $W_{11T}/W_{12B} \geq 1.2$, or $W_{11T}/W_{12B} \geq 1.4$. Other examples include $W_{11T}/W_{12B} \leq 1.4$, $W_{11T}/W_{12B} \leq 1.6$, $W_{11T}/W_{12B} \leq 1.8$, or $W_{11T}/W_{12B} \leq 2$. $W_{11T}$ and $W_{12B}$ are measured perpendicular to a longitudinal axis 14 of the wires 12 and parallel to a plane 32 at the proximal end $21_p$ of the reflective ribs 21. Forming the cap 22 with a maximum thickness $Th_{CS}$ in an upper 50% (above plane 31) of the wire 12 can shield a top of the substrate rib $11_R$, allowing formation of this shape.

A width $W_{11T}$ of the top $11_T$ of the substrate rib $11_R$ can be about the same as a maximum width $W_{12}$ of the wire 12 ($W_{11T} \sim W_{12}$). For example, $0.7 \leq W_{12}/W_{11T}$, $0.85 \leq W_{12}/W_{11T}$, or $1 \leq W_{12}/W_{11T}$. Other examples include $W_{12}/W_{11T} \leq 1$, $W_{12}/W_{11T} \leq 1.15$, or $W_{12}/W_{11T} \leq 1.3$. Widths $W_{11T}$ and $W_{12}$ are measured perpendicular to the longitudinal axis 14 of the wire 12 and parallel to the plane 32 at the proximal end $21_p$ of the reflective ribs 21.

Cap material can be selected for improved wire grid polarizer performance and improved corrosion resistance of the cap 22. The cap material can be formed from material of the reflective rib 21, material of a mask-layer 62 (see FIG. 6) used for etching the reflective ribs 21, material of the substrate 11, etch gas chemistry, or combinations thereof.

Material of the reflective rib 21, material of the mask-layer 62, or both can be released into the etch chamber, then deposited as part of the cap 22 while etching the polarizing-layer 52 to form the reflective rib 21, as described below. Material of the substrate 11 can be released into the etch chamber, then deposited as part of the cap 22 while etching the substrate to form the substrate ribs $11_R$.

For example, the cap 22 can include the following chemistry: (a) carbon; (b) a carbon atom bonded to a single oxygen atom with a single bond, such as for example an alcohol or an ether; (c) a carbon atom bonded to a single oxygen atom with a double bond, such as for example carbonyl or aldehyde; (d) a carbon atom bonded to one oxygen atom with a double bond and to another oxygen atom with a single bond, such as for example carboxyl, carboxylate, or ester; (e) aluminum; (f) aluminum fluoride; (g) aluminum oxide; (h) fluorine; (g) oxygen; (h) silicon; or (i) combinations thereof.

The cap 22 can include carbon atoms, each bonded to another carbon atom with a single bond but not bonded to oxygen, in the following atomic percentages: ≥0.1%, ≥0.5%, or ≥2%; and ≤4%, ≤10%, or ≤20%. The cap 22 can include carbon atoms, each bonded to a single oxygen atom with a single bond, in the following atomic percentages: ≥0.1%, ≥0.5%, ≥2%, or ≥4%; and ≤5%, ≤10%, or ≤20%. The cap 22 can include carbon atoms, each bonded to a single oxygen atom with a double bond, in the following atomic percentages: ≥0.1%, ≥0.5%, or ≥1.5%; and ≤3%, ≤6%, ≤10%, or ≤20%. The cap 22 can include carbon atoms, each bonded to one oxygen atom with a single bond and bonded to another oxygen atom with a double bond, in the following atomic percentages: ≥0.05%, ≥0.2%, or ≥0.5%; and ≤1%, ≤5%, or ≤10%.

The cap 22 can include aluminum atoms in the following atomic percentages: ≥5%, ≥ 10%, or ≥20%; and ≤20%, ≤30%, ≤45%, or ≤60%. These aluminum atoms can be in aluminum fluoride, aluminum oxide, or both. The cap 22 can include fluorine atoms in the following atomic percentages: ≥1%, ≥5%, or ≥10%; and ≤10%, ≤15%, or ≤30%. The cap 22 can include oxygen atoms in the following atomic percentages: ≥10%, ≥15%, or ≥30%; and ≤30%, ≤45%, or ≤60%. The cap 22 can include silicon atoms in the following atomic percentages: ≥0.1%, ≥ %, or ≥5%; and ≤10%, ≤15%, or ≤20%.

A total atomic percent of all elements in the cap 22 is of course 100%.

Figure 5:
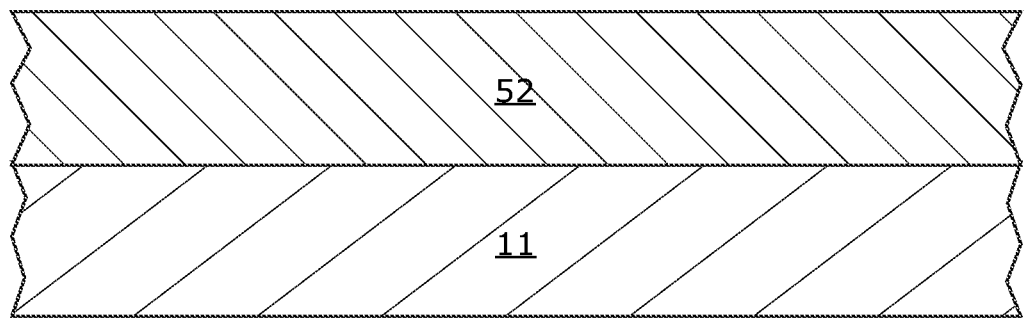
FIG. 5 is a cross-sectional side-view illustrating a step in a method of making a wire grid polarizer, including applying a polarizing-layer 52 to a surface of a substrate 11.
Figure 6:
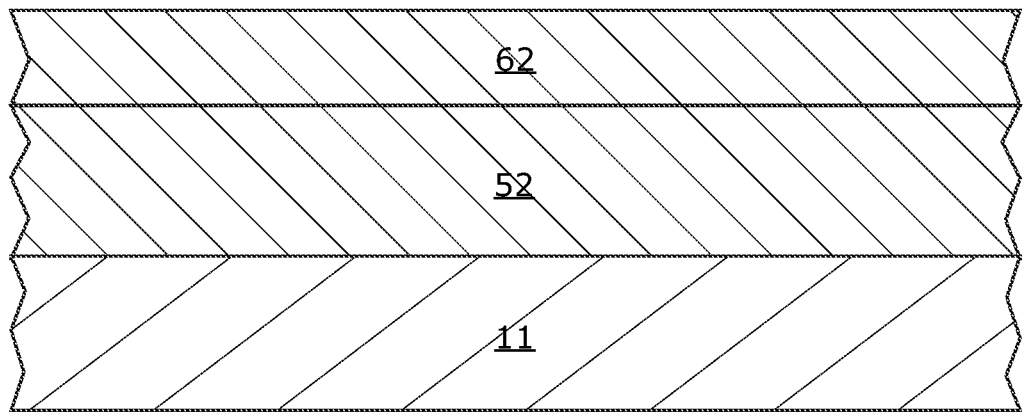
FIG. 6 is a cross-sectional side-view illustrating a step in a method of making a wire grid polarizer, including applying a mask-layer 62 on the polarizing-layer 52.
Figure 7:
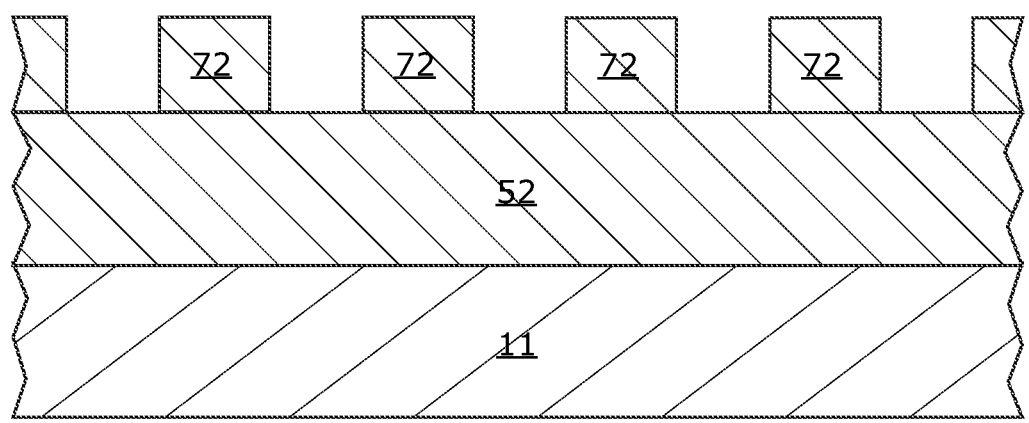
FIG. 7 is a cross-sectional side-view illustrating a step in a method of making a wire grid polarizer, including forming a grid pattern 72 in the mask-layer 62.

The carbon atoms in the cap 22 can come from the mask-layer 62, from etch gas chemistry, or both (see method section below and FIG. 6). The aluminum atoms in the cap 22 can come from etching the polarizing-layer 52 (see method section below and FIGS. 5-7). The fluorine atoms in the cap 22 can come from etch gas chemistry (see the method section below and FIG. 4). The oxygen atoms and the silicon atoms in the cap 22 can come from the mask-layer 62, from etching the substrate 11 to form the grid of substrate ribs 11$_R$, or both (see the method section below and FIG. 4).

METHOD

A method of making a wire grid polarizer with a protective cap 22 can include some or all of the following steps. These steps can be performed in the following order or other order if so specified. Some of the steps can be performed simultaneously unless explicitly noted otherwise in the claims. Components of the wire grid polarizer, and the wire grid polarizer itself, can have properties as described above.

The method can comprise:
- step 1: applying a polarizing-layer 52 to a surface of a substrate 11 (see FIG. 5);
- step 2: applying a mask-layer 62 on the polarizing-layer 52, the mask-layer 62 including organic moieties (see FIG. 6);
- step 3: forming a grid pattern 72 in the mask-layer 62 (see FIG. 7);
- step 4: etching the polarizing-layer 52, with the grid pattern 72 as a mask, to form an array of wires 12 in the polarizing-layer 52 and a cap 22 on each wire of the array of wires 12 (see FIGS. 1-3); and
- step 5: using the wire grid as a mask to etch a grid of substrate ribs 11$_R$ into the substrate 11, each substrate rib 11$_R$ aligned with one of the wires 12 of the wire grid (see FIG. 4).

In step 2, the polarizing-layer 52 can be a reflective material.

In step 2, the mask-layer 62 can initially be a liquid with solid nanoparticles dispersed throughout a continuous phase, the nanoparticles including the organic moieties. Example chemistry of the organic moieties includes —$CH_3$, $CH_2CH_3$, —OR, —OCOR, —$N(R)_2$, or combinations thereof, where R is an alkyl group.

Step 2 can further comprise curing the mask-layer 62 into a solid, interconnecting network of the nanoparticles, prior to using the mask-layer 62 as a mask to etch the polarizing-layer 52. Baking to drive out volatile solvents can be used for curing.

Chemistry of the mask-layer 62 can include tetramethyl orthosilicate, methyltrimethoxysilane, methanol, bis(2-ethoxyethyl) ether, ethyl diglycol, propyl alcohol, tert-butyl alcohol, or combinations thereof.

Step 2 can further comprise:
- (a) spin coating an uncured layer onto the polarizing-layer 52 to form part of the mask-layer 62, defining a first spin coat;
- (b) baking the mask-layer 62, defining a first bake;
- (c) spin coating an uncured layer onto the first spin coat, defining a second spin coat; then
- (d) baking the polarizer or coated substrate 11, defining a second bake.

The spin coating and the baking steps can be repeated a third time, a fourth time, or more times. The spin coatings can form the mask-layer 62. Uniformity of the mask-layer 62 can be improved by multiple repeats of these spin coating and baking steps, but cost also increases with each repeat. Therefore, uniformity specifications can be weighed against cost in deciding the number of repeats, if any. Increased uniformity of the mask-layer 62 can improve etching the polarizing-layer 52 and chemistry of the cap 22.

Time of each spin coat depends on desired thickness and on the spin coater. Example times include ≥2 seconds, ≥4 seconds, or ≥6 seconds; and ≤10 seconds, ≤20 seconds, or ≤30 seconds for each spin coat.

Examples of speed of the first spin coat, the second spin coat, or additional spin coatings include ≥100 rpm, ≥500 rpm, ≥1000 rpm, or ≥1500 rpm; and ≤2500 rpm, ≤3000 rpm, ≤4000 rpm, or ≤8000 rpm. Examples of temperature of the first bake, the second bake, or other bakes include ≥30° C., ≥50° C., ≥100° C., or ≥150° C.; and ≤250° C., ≤300° C., or ≤400° C.

In step 3, example methods of forming the grid pattern 72 include nanoimprint lithography and laser interference lithography. Nanoimprint lithography is preferred because it has resulted in a more durable cap 22 and higher polarizer performance.

In step 4, etch chemistry can include hydrogen bromide to assist in formation of the cap 22. Etching can include flowing the following gases into the etch chamber where the polarizing-layer 52 is etched and the cap 22 is formed: (a) carbon tetrafluoride to form the grid pattern 72 in the mask-layer 62; (b) boron trichloride as an initial etch to form the array of wires 12; (c) argon, nitrogen, and hydrogen bromide as a final etch to form the array of wires 12; then (d) carbon tetrafluoride and oxygen to etch the substrate 11 to form the substrate ribs 11$_R$.

In step 4, reduced flow of etch gases, lower temperature, and lower pressure can help form the cap 22 or increase thickness of the cap 22.

An example etch tool for step 4 is Lam Research Model 2300 Versys Kiyo 45.

The cap 22 can have a material composition as described above the method.

What is claimed is:

1. A wire grid polarizer, comprising:
an array of wires on a substrate with a channel between each pair of adjacent wires;
each wire includes a cap on a reflective rib;
the reflective rib has a distal end farthest from the substrate, a proximal end closest to the substrate, and a pair of sidewalls;
each sidewall faces a channel and extends from the distal end to the proximal end;
the cap is located on the distal end and the pair of sidewalls; and
the cap includes carbon; and
the cap further comprises: 0.5 atomic percent to 10 atomic percent of atoms in the cap are carbon atoms, each bonded to another carbon atom with a single bond and which is not bonded to oxygen: 0.5 atomic percent to 10 atomic percent of atoms in the cap are carbon atoms, each bonded to a single oxygen atom with a single bond; 0.5 atomic percent to 10 atomic percent of atoms in the cap are carbon atoms, each bonded to a single oxygen atom with a double bond: 0.5 atomic percent to 10 atomic percent of atoms in the cap are carbon atoms, each bonded to one oxygen atom with a single bond and bonded to another oxygen atom with a double bond; 10 atomic percent to 45 atomic percent of atoms in the cap are aluminum atoms; one atomic percent to 15 atomic percent of atoms in the cap are fluorine atoms; and 20 atomic percent to 60 atomic percent of atoms in the cap are aluminum atoms.

2. The wire grid polarizer of claim 1, further comprising:
the wire is located on a substrate rib;
the substrate rib is integral with the substrate;
each substrate rib has a base adjoining the substrate and a top adjoining a bottom of the wire;
$W_{11T} > W_{12B}$, where $W_{11T}$ is a width of the top of the substrate rib and $W_{12B}$ is a width of the bottom of the wire, both widths $W_{11T}$ and $W_{12B}$ measured perpendicular to a longitudinal axis of the wire and parallel to a plane at the proximal end of the reflective ribs.

3. The wire grid polarizer of claim 2, wherein $1.2 \leq W_{11T}/W_{12B} \leq 2$.

4. The wire grid polarizer of claim 2, wherein $1.1 \leq W_{11B}/W_{11T} \leq 1.4$, where $W_{11B}$ is a width of the base of the substrate rib measured perpendicular to the longitudinal axis of the wire and parallel to the plane at the proximal end of the reflective ribs.

5. The wire grid polarizer of claim 2, wherein $0.85 \leq W_{12}/W_{11T} \leq 1.15$, where $W_{12}$ is a maximum width of the wire measured perpendicular to the longitudinal axis of the wire and parallel to the plane at the proximal end of the reflective ribs.

6. The wire grid polarizer of claim 1, wherein each cap is separated from caps of adjacent wires by the channels.

7. The wire grid polarizer of claim 1, wherein $1 \leq W_R/Th_{CS} \leq 3$, where:
$W_R$ is a maximum width of the reflective rib and $Th_{CS}$ is a maximum thickness of the cap on the sidewall;
both the maximum width $W_R$ and the maximum thickness $Th_{CS}$ measured on a single wire, measured perpendicular to a longitudinal axis of the wire, and measured parallel to a plane at the proximal end of the reflective ribs.

8. The wire grid polarizer of claim 1, wherein $1.5 \leq Th_{CS}/Th_{CD} \leq 4$, where:
$Th_{CS}$ is a maximum thickness of the cap on the sidewall and $Th_{CD}$ is a maximum thickness of the cap on the distal end;
both the maximum thicknesses $Th_{CS}$ and $Th_{CD}$ are measured on a single wire and measured perpendicular to a longitudinal axis of the wire; and
the maximum thickness $Th_{CS}$ of the cap on the sidewall is measured parallel to a plane at the proximal end of the reflective ribs; and
the maximum thickness $Th_{CD}$ of the cap on the distal end is measured perpendicular to the plane at the proximal end of the reflective ribs.

9. The wire grid polarizer of claim 1, wherein:
each reflective rib has a maximum width in a lower 50% of the wire closest to the substrate; and
each cap has a maximum thickness on the sidewall of the reflective rib in an upper 50% of the wire farthest from the substrate.

10. The wire grid polarizer of claim 1, wherein the cap completely covers the distal end and $\geq 70\%$ of the sidewalls.

11. The wire grid polarizer of claim 1, wherein the cap further comprises:
a carbon—carbon single bond;
a carbon—oxygen single bond;
a carbon atom bonded to a single oxygen atom with a double bond; and
another carbon atom bonded to one oxygen atom with a double bond and to another oxygen atom with a single bond.

12. The wire grid polarizer of claim 1, wherein the cap further comprises aluminum, oxygen, and fluorine.

13. The wire grid polarizer of claim 1, wherein the cap further comprises aluminum fluoride and aluminum oxide.

14. A method of making a wire grid polarizer with a protective cap, the method comprising:
applying a polarizing-layer to a surface of a substrate;
applying a mask-layer on the polarizing-layer, the mask-layer including organic moieties;
forming a grid pattern in the mask-layer;
etching the polarizing-layer with etch chemistry including hydrogen bromide, with the grid pattern as a mask, to form an array of wires in the polarizing-layer and a cap on each wire, the cap including carbon.

15. The method of claim 14, wherein the etch chemistry of the etching of the polarizing-layer further comprises simultaneously flowing argon and nitrogen with the hydrogen bromide into an etch chamber where the polarizing-layer is etched.

16. The method of claim 15, wherein the etch chemistry of the etching of the polarizing-layer further comprises flowing boron trichloride, prior to flowing argon, nitrogen, and hydrogen bromide, into the etch chamber.

17. The method of claim 16, wherein the etch chemistry of the etching of the polarizing-layer further comprises:
flowing carbon tetrafluoride into the etch chamber prior to flowing boron trichloride; and
flowing carbon tetrafluoride into the etch chamber after ceasing flow of argon, nitrogen, and hydrogen bromide.

18. The method of claim 14, further comprising using the wire grid as a mask to etch a grid of substrate ribs into the substrate, each substrate rib aligned with one of the wires of the wire grid, and the etch chemistry of the etch of the substrate ribs into the substrate includes simultaneously flowing carbon tetrafluoride and oxygen into an etch chamber where the substrate is etched.

19. The method of claim 14, wherein:
the mask-layer is initially a liquid with solid nanoparticles dispersed throughout a continuous phase, the nanoparticles including the organic moieties; and
the method further comprises curing the mask-layer into a solid, interconnecting network of the nanoparticles, prior to using the mask-layer as a mask to etch the polarizing-layer.

* * * * *